May 11, 1948. C. G. SEYFERTH 2,441,293
TRACTOR-SEMI-TRAILER COUPLING
Filed Nov. 22, 1946 3 Sheets-Sheet 1

INVENTOR.
CARL G. SEYFERTH.
BY
Barnes, Kisselle, Laughlin & Rauch
ATTORNEYS.

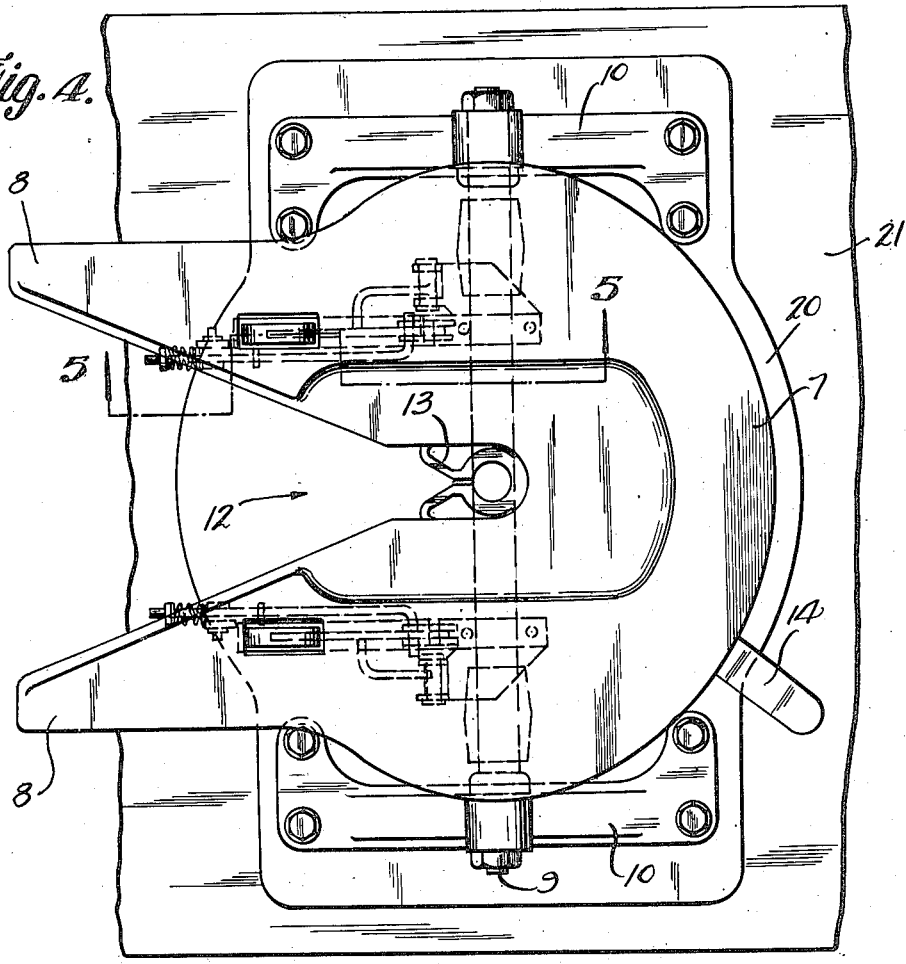
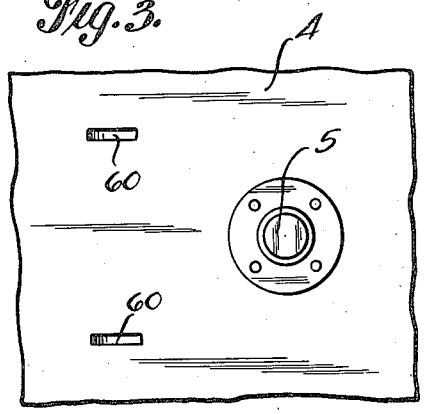

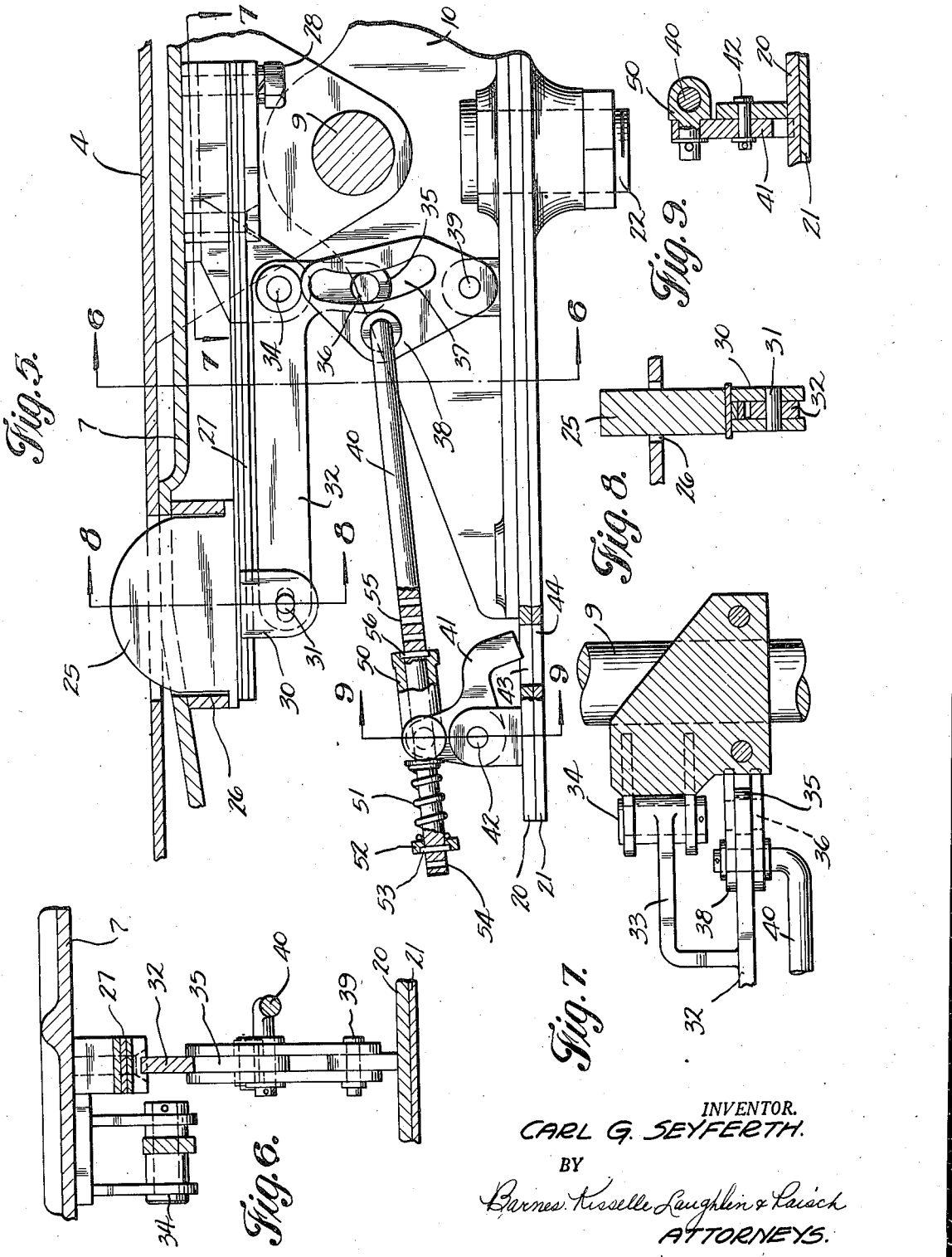

Patented May 11, 1948

2,441,293

UNITED STATES PATENT OFFICE 2,441,293

TRACTOR-SEMITRAILER COUPLING

Carl G. Seyferth, Muskegon, Mich.

Application November 22, 1946, Serial No. 711,652

6 Claims. (Cl. 280—33.05)

This invention relates to the so-called fifth wheel coupling between a tractor and a semi-trailer and it has to do particularly with an automatically acting interlocking arrangement.

In a tractor and semi-trailer arrangement, wherein the lower fifth wheel member on the tractor is mounted so that it can rock on an axis, such axis is positioned transversely of the tractor to provide an articulation as the combined vehicle moves over irregularities such as hummocks or depressions in the roadway. When, however, the tractor and the semi-trailer are positioned at a sharp angle relative to each other, this axis extends in a direction lengthwise of the trailer. If the angle between the tractor and the semi-trailer is 90°, then the axis parallels the length of the semi-trailer and there is no lateral stability for the semi-trailer.

This situation does not prevail where the rocking fifth wheel member is mounted on the semi-trailer. However, as mentioned above it is usual to put the rocking fifth wheel on the tractor. And if a double fifth wheel or separate turntable is provided, between the tractor and the rocking fifth wheel, as shown, for example, in the Soulis Patent No. 2,188,727 of January 30, 1940, then the rocking fifth wheel may be made to turn with the semi-trailer.

Such a construction, however, requires an interlocking arrangement, so that, depending upon the equipment employed, the relative turning between the tractor and the semi-trailer about the vertical axis will take place either at the fifth wheel or at the secondary turntable. Accordingly, the invention has, as its principal object, the provision of a mechanism for automatically conditioning the coupling construction for turning movement at the proper location depending upon the type and construction of the semi-trailer which is used therewith. A structure for carrying out the invention is disclosed in the accompanying drawings.

Fig. 3 is a plan view of the underside of the upper fifth wheel on a semi-trailer.

Fig. 4 is an enlarged plan view of the rocking fifth wheel on the tractor.

Fig. 5 is a detailed view with some parts cut away and some parts in section showing the construction of the interlocking arrangement.

Fig. 6 is a sectional view taken substantially on line 6—6 of Fig. 5 showing the arrangement of the interlocking mechanism.

Fig. 7 is a sectional view taken substantially on line 7—7 of Fig. 5 showing some of the mounting of the mechanism.

Fig. 8 is a sectional view taken substantially on line 8—8 of Fig. 5 showing a latching element.

Fig. 9 is a sectional view taken substantially on line 9—9 of Fig. 5.

Figure 1:
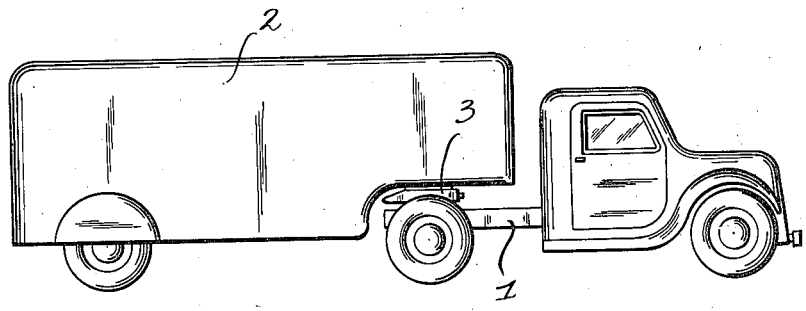
Fig. 1 is a general view showing a tractor and semi-trailer combination vehicle.

As generally indicated in Fig. 1, a tractor is illustrated at 1 and a semi-trailer at 2. The forward end of the semi-trailer rests upon the tractor through coupling means, one part of which may be a standard form of rocking fifth wheel generally shown at 3.

Figure 2:
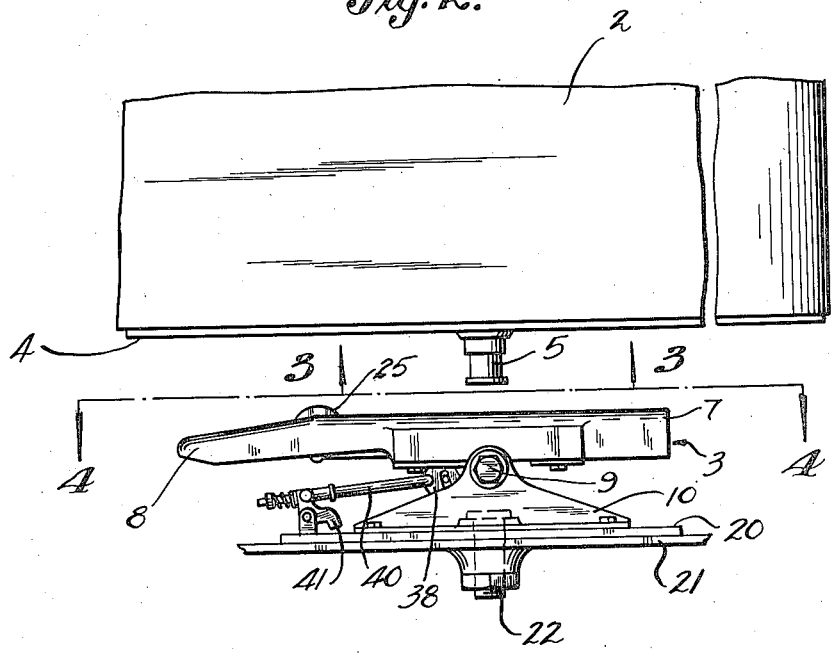
Fig. 2 is a side elevational view illustrating the lower fifth wheel and the turntable with the trailer structure spaced above the same.

As illustrated in Fig. 2, the semi-trailer is provided with an upper fifth wheel member which may be simply in the form of a plate 4 and a depending king pin 5. The rocking fifth wheel member comprises a member 7 which may have inclined tail pieces 8. This member is mounted to rock on an axis member 9 which is mounted in brackets 10 attached to the tractor. As shown in Fig. 4, the lower fifth wheel member 7 has a V-shaped slot 12 into which the king pin is guided as the tractor and semi-trailer are coupled and uncoupled in the well known manner, and in a central location is a latch construction 13 for engaging around the king pin to establish the coupling. This latch may be opened by means of a suitable operating handle 14 connected to the latch construction by suitable mechanism (not shown).

The brackets 10 are mounted on the tractor through what may be termed a turntable residing in a suitable upper member 20 to which the brackets 10 are attached, and a lower turntable member 21. These two members are suitably connected together by a king bolt 22 and the lower member 21 is suitably attached to the tractor.

Accordingly, it will be observed that when a tractor and semi-trailer are coupled together as shown in Fig. 1, that the vertical turning axis may be at the king pin 5 or at the king bolt 22. In order to clearly identify the different parts of the structure, the members 20 and 21 have been termed turntable plates, while the members 4 and 7 have been termed fifth wheel members. When the members 4 and 7 are latched together, the members 20 and 21 serve as fifth wheel members and, vice versa, when the members 20 and 21 are locked together the fifth wheel members 4 and 7 serve as turntable plates. This selection of terminology has been made with the thought of making the description and the claims clearly understandable and the terminology is not to be considered as words of limitation.

The interlocking arrangement as shown in detail in Figs. 5 to 9 inclusive, resides in latch members 25 positioned for movement in recesses 26 of the lower fifth wheel member. Each latch member is normally held projected upwardly in the opening 26 by a spring structure 27, which may comprise several leaves, secured to the underside of the fifth wheel member 7 as by means of bolts 28. Secured to the spring structure and also preferably secured to the latching device 25 are depending members 30 which have a pin and slot connection, with the slot being elongated as shown at 31, with a lever 32. This lever has an offset portion 33 provided with a fulcrum 34. The lever has a depending part 35 provided with a pin 36 positioned in arcuate slots 37 in links 38 pivoted as at 39 to the upper member of the turntable. As shown in Fig. 7, two of such links are provided; they are identical and the depending part 35 of the lever operates between them. The arcuate slots 37 are on an arc around the center of the axis member 9 so that rocking action of the fifth wheel member 7 about the axis 9 does not cause an actuation of the links 38.

Connected to the links 38 is an actuator rod 40 for actuating a latch 41 pivotally mounted as at 42 on the upper member of the turntable and arranged to interengage in apertures 43 and 44 in the turntable plates. The latch member 41 has an arm portion which is provided with a fitting 50 through which the actuator rod 40 extends. The rod 40 is slidable in the fitting 50 and on the end of the rod is a coil spring 51 backed up by a washer abutment 52. This washer may be adjustably mounted on the rod by means of a pin 53 insertable in one of a plurality of apertures as shown at 54. There is also an adjustable arrangement between the actuator rod and the opposite end of the fitting 50 which resides in a plurality of apertures 55 for receiving a pin 56 arranged to abut the end of the fitting 50.

The usual semi-trailer, at the present time, has the depending king pin 5 with a solid upper fifth wheel plate 4 as shown in Fig. 2. For use with this construction, the upper fifth wheel member on the semi-trailer is provided with the same king pin 5 but the plate itself, as shown at 4a in Fig. 3, is provided with apertures 60 for receiving the latches 25.

While a single interlocking structure is shown and described in Figs. 5 to 9 inclusive, it is to be appreciated that a duplicate interlocking arrangement may, and preferably is, employed as shown in Fig. 4 with one interlocking arrangement positioned on each side of the center line. The locking arrangements are otherwise identical except as to the possible provision of making some of the parts for right hand and left hand installation.

When a semi-trailer equipped with an upper fifth wheel member, as shown in Fig. 3, is used with a tractor equipped with the construction as shown and described, the upper fifth wheel plate 4 rides into position on the upper surface of the fifth wheel member 7 and depresses the latches 7 against the action of the springs 27. This causes an articulating movement of the lever about its fulcrum point 34 and a swinging movement of the links 38 about their axes 39. This is permitted without corresponding movement of the latches 41 by reason of the springs 51 if the aperture 44 is not in alignment with aperture 43. When, however, the apertures 60 come into alignment with the latches 25, which may occur upon initial connection of the vehicles if the alignment is proper, or which may occur upon relative turning action, the latches 25 snap into the apertures 60 and the trailer and the upper fifth wheel member 7 are thereby locked together against relative rotation. In the operation of the combined vehicle, the turning movement occurs at the king bolt 22 with the upper plate 20 turning on the lower plate 21. In this position, the latches 41 are held retracted as shown in Fig. 5. This is accomplished by a thrust action by the actuator rod 40 and the position of the latches may be accurately determined by a selective adjustment of the pin 56.

Now, when a tractor is so equipped with the combined fifth wheel and the turntable arrangement, and it is used with a semi-trailer not equipped with an apertured upper fifth wheel plate, such as the plate 54, the latches 25 are held depressed so long as the trailer is in position. This swings the levers 34 about their fulcrums and the pin 36 swings in an arc about the fulcrum 34 and thus swings the links 38 about their fulcrum 39 in a clockwise direction as Fig. 5 is viewed. If, at this time, the apertures 43 and 44 in the turntable plates 20 and 21 are aligned, the latches 41 are shifted into these aligned apertures and therefore the turntable plates are locked against relative rotation. If the apertures are not aligned at the time, the latches are set by the compression of the springs 51 and will snap into the apertures 44 of the lower plate when the same become aligned therewith.

Accordingly, the combined fifth wheel and turntable construction may be employed changeably with semi-trailers designed to function with the combined fifth wheel and turntable arrangements, and likewise, with trailers, which may be old equipment, and which are not provided with the locking apertures 60. Moreover, the entire function is automatic, requiring no attention or thought on the part of the operator.

I claim:

1. A fifth wheel construction for a tractor adapted to support and connect to semi-trailers which have upper fifth wheel members, some of which are provided with latch keepers and some of which are not provided with latch keepers, a lower turntable plate adapted to be mounted upon a tractor, an upper turntable plate mounted on the lower turntable plate for turning movement about a substantially vertical axis, a lower fifth wheel member, mounting means pivotally connecting the lower fifth wheel member to the upper turntable plate for rocking movement about a substantially horizontal axis, said lower fifth wheel member adapted to receive and support the upper fifth wheel member of a semi-trailer for relative turning movement about a substantially vertical axis, a fifth wheel latch movably mounted on the lower fifth wheel member, a turntable latch, means interconnecting the two latches for actuation of the turntable latch upon movement of the fifth wheel latch, the fifth wheel latch being engageable with a keeper in the upper fifth wheel member in a semi-trailer to lock the fifth wheel members together for relative turning movement of the turntable plates, the fifth wheel latch being movable by and held positioned by an upper fifth wheel member which does not have a keeper to actuate the turntable latch to lock the turntables together against relative turning movement for relative turning of the fifth wheel members.

2. A fifth wheel construction for a tractor adapted to support and connect to semi-trailers which have upper fifth wheel members, some of which are provided with latch keepers and some of which are not provided with latch keepers, a lower turntable plate adapted to be mounted upon a tractor, an upper turntable plate mounted on the lower turntable plate for turning movement about a substantially vertical axis, a lower fifth wheel member, mounting means pivotally connecting the lower fifth wheel member to the upper turntable plate for rocking movement about a substantially horizontal axis, said lower fifth wheel member adapted to receive and support the upper fifth wheel member of a semi-trailer for relative turning movement about a substantially vertical axis, a latch carried by the lower fifth wheel member and projecting upwardly therefrom and adapted to engage a keeper in an upper fifth wheel member and adapted to be moved and held positioned by an upper fifth wheel member without a keeper, a turntable latch, means interconnecting the two latches for actuation of the turntable latch to a posiion for locking the turntables against relative turning movement when the fifth wheel latch is held positioned by an upper fifth wheel member which does not have a keeper therefor.

3. Coupling means for a tractor and semi-trailer comprising, upper and lower turntable plates, the lower one of which is adapted to be connected to a tractor, a lower fifth wheel member adapted to receive and support an upper fifth wheel member on a semi-trailer, means mounting the lower fifth wheel member on the upper turntable plate for rocking movement about a substantially horizontal axis, a spring pressed latch mounted on the lower fifth wheel member adapted to engage a keeper in an upper fifth wheel member and adapted to be shifted in position by an upper fifth wheel member which does not have a keeper, a turntable latch for locking the turntables against relative turning movement, and operating means interconnecting the latches so that the turntable latch is shifted into latching position and out of latching position as the fifth wheel latch is engaged by upper fifth wheel members which do not have and which do have keepers for the fifth wheel latch respectively.

4. Coupling means for a tractor and semi-trailer comprising, upper and lower turntable plates, the lower one of which is adapted to be connected to a tractor, a lower fifth wheel member adapted to receive and support an upper fifth wheel member on a semi-trailer, means mounting the lower fifth wheel member on the upper turntable plate for rocking movement about a substantially horizontal axis, a fifth wheel latch movably mounted on the lower fifth wheel member, a spring for normally projecting the said latch above the surface of the lower fifth wheel member, a turntable latch mounted on the upper turntable for latching the turntables against relative turning, operating means connecting the latches including a yieldable connection, the said spring normally holding the turntable latch in unlatched position when the fifth wheel latch is projected above the surface of the lower fifth wheel, as for example when it is in a keeper in an upper fifth wheel member, and the turntable latch being actuated into latched position when the fifth wheel latch is depressed by an upper fifth wheel member which does not have a keeper therefor.

5. In combination with a coupling for a tractor and a semi-trailer having upper and lower turntable plates, the lower one of which is adapted to be mounted upon a tractor, a lower fifth wheel member mounted on the upper turntable plate for rocking movement about a substantially horizontal axis, the lower fifth wheel member adapted to receive and support an upper fifth wheel member on a semi-trailer; of interlocking means comprising a first latch mounted on the lower fifth wheel member, a second latch mounted on the upper turntable plate for locking the turntable plates together against relative turning movement, operating means connecting the latches, spring means normally holding the first latch in latching position and holding the second in unlatched position, the first latch adapted to engage in a keeper in an upper fifth wheel member on a semi-trailer so that the fifth wheel members are locked together against turning movement for relative turning movement of the turntable plates and the first latch being adapted to be engaged and shifted to unlatched position by an upper turntable plate which has no keeper for actuating the second latch to lock the turntable plates together against relative turning movement.

6. In combination with a coupling for a tractor and a semi-trailer having upper and lower turntable plates, the lower one of which is adapted to be mounted upon a tractor, a lower fifth wheel member mounted on the upper turntable plate for rocking movement about a substantially horizontal axis, the lower fifth wheel member adapted to receive and support an upper fifth wheel member on a semi-trailer; of interlocking means comprising a first latch mounted on the lower fifth wheel member, a second latch mounted on the upper turntable plate for locking the turntable plates together against relative turning movement, a link pivotally mounted on the upper turntable plate, means including a yieldable connection connecting the said link with the second latch, a lever connecting the link with the first latch, spring means normally holding the first latch in latching position and holding the second latch in unlatched position, said first named latch being adapted to engage in a keeper in an upper fifth wheel member for locking the fifth wheel member together against relative turning movement and adapted to be engaged and shifted to unlatched position by an upper fifth wheel member which does not have a keeper therefor, for the positioning of the second latch respectively into unlatched and latched position.

CARL G. SEYFERTH.